No. 701,916. Patented June 10, 1902.
W. MORRISON.
SAW FOR MAKING SECONDARY BATTERY GRIDS.
(Application filed June 18, 1900.)
(No Model.)
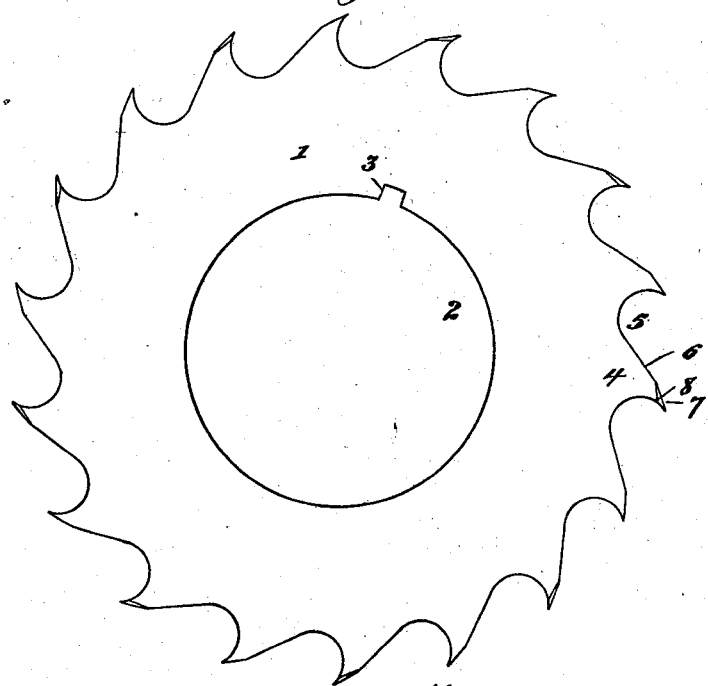
Fig. 1.
Fig. 2.
Fig. 3.
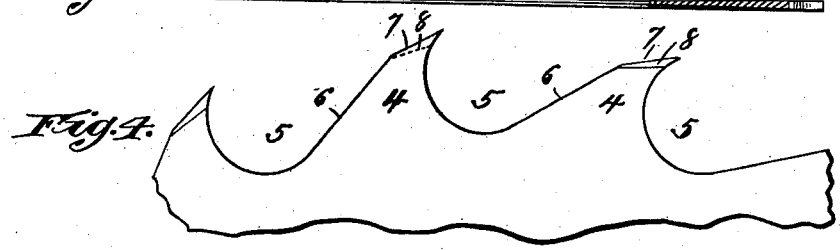
Fig. 4.
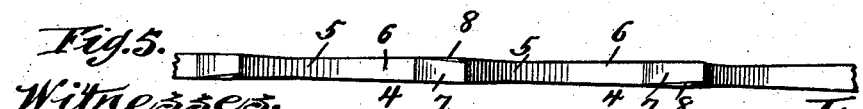
Fig. 5.
Witnesses,
F. S. Mann
Frederick F. Goodwin
Inventor,
William Morrison
By Offield, Towle & Linthicum
Attys.

United States Patent Office.

WILLIAM MORRISON, OF CHICAGO, ILLINOIS, ASSIGNOR TO THE HELIOS-UPTON COMPANY, OF CHICAGO, ILLINOIS, A CORPORATION OF NEW JERSEY.

SAW FOR MAKING SECONDARY-BATTERY GRIDS.

SPECIFICATION forming part of Letters Patent No. 701,916, dated June 10, 1902.

Application filed June 18, 1900. Serial No. 20,663. (No model.)

*To all whom it may concern:*

Be it known that I, WILLIAM MORRISON, a citizen of the United States, residing at Chicago, in the county of Cook and State of Illinois, have invented certain new and useful Improvements in Saws for Making Secondary-Battery Grids, &c., of which the following is a specification.

This invention relates to saws for making secondary-battery grids, and has for its object to provide a construction whereby a higher degree of efficiency may be obtained and a better class of work produced. Battery-grids for secondary batteries, in the construction of which saws embodying my improvements are to be used, are made from blanks in the form of plates or thick sheets of lead, and the saws are employed in gangs for the purpose of cutting the lateral surfaces of these lead plates into a plurality of parallel grooves, leaving between the grooves intermediate projections. In practice it has been found exceedingly difficult to construct the saws in such a manner that they will properly enter the lead to the desired depth and cut the grooves in a uniform and rapid manner without clogging the saws or destroying the lead plate.

It is the object of my present invention to produce a saw which will obviate these difficulties; and to that end the invention consists in certain novel features, which I will now proceed to describe and will then particularly point out in the claims.

In the accompanying drawings, Figure 1 is a side elevation of a saw embodying my invention. Fig. 2 is a plan view of a portion of a gang of such saws assembled. Fig. 3 is a sectional view of one of the saws. Fig. 4 is an enlarged detail view of a portion of Fig. 1, and Fig. 5 is a plan view of Fig. 4.

In the said drawings, 1 indicates the saw as a whole, it being formed from a disk of steel or other suitable material and provided with a central aperture 2 to receive the arbor on which it is mounted and with a keyway 3 to receive the key by means of which it is secured on said arbor. The body of the saw is made tapering or of gradually-diminishing thickness from its periphery toward its center, and at the periphery it is provided with teeth 4, having the usual gullets 5 between them. Each tooth has, in addition to the curved front portion forming the gullet, an inclined back portion 6, and its outer extremity is beveled from its point to a junction with the inclined back portion 6, as indicated at 7, to form a peripheral clearance. In order to give a lateral clearance, each tooth is cut away at one side, as indicated at 8, and I prefer to thus cut away that portion of the tooth which lies above and forward of the point of junction of the parts 6 and 7. Any portion of the tooth within half of its width may, however, be thus cut, if desired. The lateral cutting away of the teeth is alternate as to the sides upon which the cutting is done, so that any one tooth of the saw is cut away on the side opposite to that on which the tooth in front of it and the tooth behind it are cut away.

In practice saws having teeth of full width arranged in the same plane are found to be ill-adapted for the cutting of grooves in lead plates, particularly when used in gangs, as they will not enter the plate unless great pressure is applied and will clog and pick up and destroy the plate. I have also found that it is not practicable to set the teeth of such saws in the usual manner, for the reason that the set cannot be made even throughout the saw or throughout the saws of the gangs. With a saw constructed as hereinbefore set forth each tooth is sufficiently narrow to readily enter the lead as to its cutting portion, and since it cuts less than the full width of the groove there will be ample lateral clearance and the saw will not clog or tend to pick up the lead plates operated upon, while at the same time the grooves will be cut uniformly and of full width and depth. The saws as thus constructed are generally used in gangs, as shown in Fig. 2, being mounted upon an arbor 9 and spaced apart by means of spacing disks or washers 10 and held in position by a key 11. The diminishing thickness of the saws toward the center serves to effectually prevent any clogging between the saws composing the gang by any wedging of the metal operated upon between said saws. A particular advantage in the use of the saws having their teeth cut away laterally is that the shavings or ribbons of lead produced by each tooth are of less width than the space between the saws, and there is consequently ample clearance between the saws for the lead thus cut out in forming the grooves.

In constructing saws of diminishing thickness toward the center it has heretofore been customary to first punch the teeth from the saw-blank and then grind the faces of the saw in order to obtain the necessary taper or diminution in thickness toward the center. I have found in practice that this results in injury to the marginal edges of the teeth, which are rounded off by the action of the grinding-tool in forming the taper referred to. I therefore in constructing my improved saw proceed to first grind the faces of the blank, so as to give it the necessary taper or diminution in thickness toward the center, and subsequently form the teeth by grinding after the saws are assembled on a suitable arbor or mandrel for that purpose.

It is obvious that the details above described may be modified—as, for instance, by cutting away only the alternate teeth laterally, leaving the intermediate teeth of full width, in which case said full teeth would only cut one half of the kerf, the other half of the tooth being idle.

I claim—

1. A saw for making battery-grids, &c., having a body of less thickness than the width of its teeth and having teeth of regularly-tapered diminishing thickness from their cutting edges inwardly toward the body and laterally cut away on alternate sides, substantially as described.

2. A gang of saws for use in making battery-grids, comprising an arbor, a plurality of saws secured thereon and each having a body of regularly-tapered diminishing thickness from its periphery toward its center and its teeth cut away laterally on alternate sides, and spacing disks or washers between the saws, substantially as described.

3. A circular saw for use in making battery-grids, having a body of regularly-tapered diminishing thickness from its periphery toward its center and provided with the teeth 4, each having the inclined clearance-bevel 7 and the lateral clearance-bevel 8, substantially as described.

WILLIAM MORRISON.

Witnesses:
FREDERICK C. GOODWIN,
IRVINE MILLER.